US009349139B1

(12) United States Patent
Gella et al.

(10) Patent No.: US 9,349,139 B1
(45) Date of Patent: May 24, 2016

(54) FINE ART SAMPLES

(71) Applicant: Amazon Technologies, Inc., Reno, NV (US)

(72) Inventors: Ganesh Kumar Gella, Bellevue, WA (US); Ramiah Kandasamy, Sammamish, WA (US); Kosar Akram Jaff, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 21 days.

(21) Appl. No.: 14/102,352

(22) Filed: Dec. 10, 2013

(51) Int. Cl.
*G06Q 30/00* (2012.01)
*G06Q 30/06* (2012.01)

(52) U.S. Cl.
CPC ........ G06Q 30/0625 (2013.01); G06Q 30/0621 (2013.01)

(58) Field of Classification Search
CPC . G06Q 30/0621; G06T 2210/04; G06T 19/00
USPC .................................... 705/26.5; 434/79, 80
See application file for complete search history.

(56) References Cited

U.S. PATENT DOCUMENTS

| | | | |
|---|---|---|---|
| 2002/0099725 A1* | 7/2002 | Gordon ................. | G06Q 10/06 |
| 2002/0105183 A1* | 8/2002 | Holt et al. ....................... | 283/81 |
| 2005/0261990 A1* | 11/2005 | Gocht et al. ..................... | 705/27 |
| 2011/0134108 A1* | 6/2011 | Hertenstein ................... | 345/419 |
| 2011/0148924 A1* | 6/2011 | Tapley .................... | G06F 3/011 345/634 |
| 2011/0310142 A1* | 12/2011 | Xu ........................... | B41M 5/00 347/7 |
| 2012/0130865 A1* | 5/2012 | Rendler ....................... | 705/27.2 |
| 2014/0132633 A1* | 5/2014 | Fekete et al. ................... | 345/634 |

OTHER PUBLICATIONS

Anonymous,"Time off: Standby for the atomic pen", Jul. 1972, Management Accounting (Pre-1986), vol. 54, Issue 1, p. 71.*
Muthyala, Ramaiah et al., *Chemistry and Applications of Leuco Dyes*, Chapters 5 & 6, Kluwer Academic Publishers, 1997, pp. 125-204.

* cited by examiner

*Primary Examiner* — Brandy A Zukanovich
*Assistant Examiner* — Brittney N Miller
(74) *Attorney, Agent, or Firm* — Kilpatrick Townsend & Stockton LLP

(57) ABSTRACT

Methods and systems for selecting and shipping an art sample that will degrade after a pre-defined period of time are provided. A user can request an art sample while browsing for items associated with an electronic marketplace. The art sample, which can be a lower quality replica of an original art piece, may be printed utilizing a printing technique which results in the art sample degrading after a pre-defined period of time. The art sample may then be shipped to the user to aid in determining whether to purchase the original art piece by utilizing the art sample to visualize the potential purchase in the user's own viewing space.

5 Claims, 10 Drawing Sheets

FINE ART SAMPLES

BACKGROUND

The ability to order merchandise online has provided consumers with various benefits when compared to brick-and-mortar sources. Consumers who utilize online ordering are provided with an efficient and safe shopping experience despite the plethora of sources from which to choose. However, consumers may base their orders solely on the information provided by various online retailers. For example, a consumer may wish to order a 60" television (TV) for their living room from an electronic marketplace. While associated details of the TV may be provided by the electronic retailer including size, weight, screen resolution, etc., a consumer may not be able to truly appreciate the physical characteristics of their potential purchase without seeing the merchandise in person. Certain merchandise, even if offered electronically, may cause hesitancy in potential purchasers simply due to the nature of the product. Consumers may be hesitant to order particular merchandise.

BRIEF DESCRIPTION OF THE DRAWINGS

Various embodiments in accordance with the present disclosure will be described with reference to the drawings, in which.

DETAILED DESCRIPTION

Figure 1:
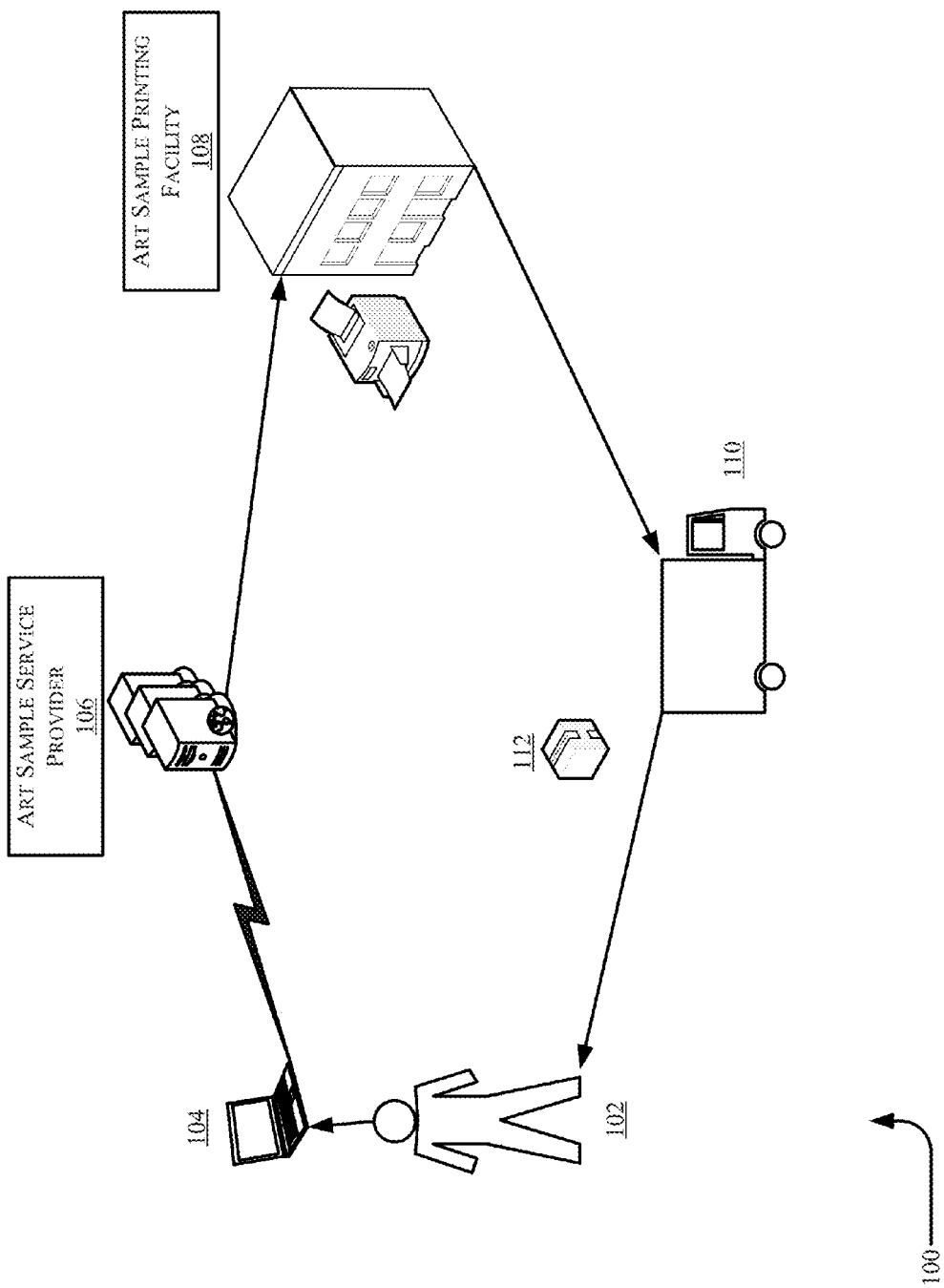
FIG. 1 is arguably a data flow diagram illustrating an example data flow for ordering an art sample, printing the art sample, and shipping the art sample.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for performing an art sample service including art sample requests, creation, delivery, and original art piece ordering via an electronic marketplace. In some examples, a user may browse an electronic marketplace via a web-page browser or any suitable independent application configured with a user friendly graphical interface (GUI) for consumable items including fine art pieces. Fine art pieces, as used herein, include any piece of art (e.g., original pieces of art, lithographs, embellished prints, originally signed prints, etc.) associated with the electronic marketplace.

In an example, the user may wish to receive more information concerning a particular fine art piece including price, dimensions, creator, creation date, etc. In some examples, the user may be presented with an option to order an art sample of the piece of fine art. As used herein the phrase "art sample" refers to a print (e.g., a lower quality and/or physically degrading replication) of an original piece of art. In accordance with at least one embodiment, the art sample may include a machine-readable label. In some examples, the electronic marketplace may ship the art sample to the user. In accordance with at least one embodiment, the art sample service or electronic marketplace may provide instructions to ship the art sample. In some examples, the communication of instructions can be performed via telephone, email, text message, standard mail, or any suitable communication method including communications across one or more public networks. For example, a user may request an art sample from an electronic marketplace and specify that the art sample should be shipped to their home. The art sample service may provide instructions to print and ship the art sample from a facility associated with the electronic marketplace to the user's home. In an example, the user may interact with the machine-readable label included with the art sample via any suitable computing device such as a mobile phone, digital camera, or computer tablet configured to recognize the machine-readable label. In some examples, once the user has interacted with the machine-readable label they may view, through their computing device, a replica of the original art piece which has replaced the art sample. Additionally, the user may also interact with the machine-readable label to order the original art piece that is associated with the art sample via the electronic marketplace. In some examples, the user may also be presented with alternative original art pieces to view through their computing device in place of the art sample. The user may also order the alternative original art pieces via the electronic marketplace.

In one embodiment, for example, a user may browse to an offer for an original piece of art (e.g., as will be used in this example embodiment the piece of art is The Scream) available through an electronic marketplace and order an associated art sample for this piece of art. The electronic marketplace may utilize a thermal printing process to create a physically degrading art sample for shipping to the user. The art sample may also be of a lower quality than that of the original art piece. The electronic marketplace may determine the quality and degradation information to be utilized during the printing process based on the original art piece or based on specified selections from the creator of the artwork. The user may receive the art sample of The Scream and determine whether the size and feel of the painting warrants ordering the original The Scream. In accordance with at least one embodiment, the art sample may physically degrade, after a period of time, such that the print is no longer useful. In an example, the degradation of the art sample can occur because the ink utilized in the thermal printing process is configured to degrade over time upon exposure to air or because other materials utilized in the printing process is configured to degrade over time.

In accordance with at least one embodiment, the user may wish to visualize the original art piece in place of the art sample to aid in deciding whether to purchase the original art piece. In an example, the user may utilize their mobile computing device to interact or scan a Quick Response Code (QR code) included on the art sample. Upon scanning the QR code the user may be presented, via an application interacting with their mobile computing device, an image representative of The Scream that replaces the art sample upon viewing the art sample through their mobile computing device. In accordance with at least one embodiment, the user may also generate an image with an imaging device (e.g., take a still photo with a camera) of the viewing area including a couch, wall, and art sample and be presented, via an application interacting with their mobile computing device, a picture of the couch, wall, and The Scream as seen through the mobile computing device which can aid the user in determining whether to purchase the original art piece. The user may also scan the QR code with their mobile computing device and be presented with an option to purchase The Scream that is associated with the art sample via an application with a friendly GUI configured to run on the mobile computing device. The user may also utilize an application interacting with the user's mobile computing device camera lens to dynamically view the living room set up replacing the image of the art sample with images of alternative original pieces of art. In accordance with at least one embodiment, the user may also order the alternative original art pieces from the electronic marketplace utilizing their mobile computing device.

In accordance with at least one embodiment, the art sample may be of lower quality because it is printed or created at a lower resolution than the original, or is printed in a different color schema (including black and white). In an example, an author or creator of an original art piece may submit their art for sale in an electronic marketplace and specify whether they wish to participate in the art sample service. If a creator opts-in to the art sample service they may then specify the quality of associated art samples. For example, a creator may choose to have an exact replica utilized for their art sample or they may choose to utilize a black and white color schema for the art sample as compared to the color filled original piece of art. In an example, an art sample may be created with several types of inherent physical degradations. In accordance with at least one embodiment, the art sample is created to degrade over time to provide Copyright protection to the author of the work and to ensure that the potential buyer will purchase the original piece of art and not just the art sample. In accordance with at least one embodiment, the art sample may be printed utilizing a thermal printing process that results in the image of the art sample degrading over time. In an example, the thermal printing process can utilize thermal paper with various leuco dyes configured to display an image of original piece of art but slowly degrade after a certain time period. The thermal printing/leuco dye process may be any printing/dye process known to enable degradation of the printed content. In accordance with at least one embodiment, the art sample may be printed with a disappearing ink that is configured to display the image of the art sample upon printing but slowly disappear/degrade over time. In an example, the electronic marketplace may utilize various inks which disappear over time as a result of exposure to light or air. In accordance with at least one embodiment, the material utilized to print the art sample with may degrade over time. In accordance with at least one embodiment, the art sample may be printed utilizing thermochromic paper which degrades after a certain period of time. In an example any suitable degradation printing process may be utilized to create an art sample.

In accordance with at least one embodiment and as described above, the art sample may include a machine-readable label. As used herein, the phrase "machine-readable label" refers to any suitable machine-readable label that stores information related to the item the label is associated with. In accordance with at least one embodiment, the machine-readable label can include a QR code, a bar code, a watermark, a radio frequency identification (RFID) tag, or an attached microchip that is hidden so as not to detract from the image displayed in the art sample. A machine-readable label can also include near field communication (NFC) technology or electronic devices that may utilize low power tags to communicate with computing devices. In accordance with at least one embodiment, a user may utilize a mobile computing device that includes an application configured to interact with the machine-readable label associated with the art sample. In an example, as a result of interacting with the machine-readable label, the user may be presented with an image representative of the original art piece that is associated with the art sample upon viewing the art sample through their mobile computing device in real time.

In accordance with at least one embodiment, the mobile computing device interacts with the machine-readable label to communicate, via the application, with an electronic marketplace to obtain useful data. For example, the electronic marketplace upon receiving the information included in the machine-readable label may be configured to display the original art piece associated with the art sample to the user. To continue the example, the electronic marketplace may also be able to communicate to the user purchase or order information concerning the associated original art piece or provide recommendations to alternative original art pieces. The user may be able to view, via the mobile computing device, the alternative original art pieces instead of the art sample they have received upon viewing the art sample through the mobile computing device. In accordance with at least one embodiment, the user may be able to interact with a virtual recreation of their viewing space, for example their living room, with the art sample via an application configured to run on the mobile computing device.

In an example, the user may be able to view the original art piece, instead of the art sample, from different perspectives through the mobile computing device. For example, the user may be able to walk closer to the art sample or further from the art sample and be presented with different perspectives of the original art piece associated with the art sample when viewed through the mobile computing device. In accordance with at least one embodiment, the user may utilize the application configured to run on their mobile computing device to be presented with an augmented reality presentation of their viewing space. The augmented reality presentation displayed through the mobile computing device can allow the user to interact with the art sample and view the associated original art piece from different points of view, such as walking towards the painting from a parallel angle as opposed to a perpendicular straight on angle.

In accordance with at least one embodiment, the user may utilize their mobile computing device to take a photograph of the viewing space that includes the art sample and communicate the photograph or resulting image to the electronic marketplace. In an example, the user may be presented with an interactable virtual room on their mobile computing device which displays the associated original art sample in place of the art sample. As used herein, the phrase "interactable" refers to a two-way transfer of information between, for example, a user and an electronic device. The user may be able to move the placement of the original piece of art in the virtual room on their mobile computing device utilizing for example touch screen commands. The user may also be able to view alternative original art pieces that have been recommended by the electronic marketplace via the application configured to run on the mobile computing device.

FIG. 1 depicts a data flow diagram illustrating an example data flow 100 for receiving an order for an art sample and shipping the art sample to a user in accordance with at least one embodiment. The data flow 100 may include a user 102 utilizing a computing device 104, which is in communication with an art sample service provider 106, to request an art sample 112. In accordance with at least one embodiment, the art sample service provider 106 may be an electronic marketplace or associated with an electronic marketplace. It should be noted that the communication between the computing device 104 and the art sample service provide 106 may be over one or more public networks. In accordance with at least one embodiment, the data flow 100 depicted in FIG. 1 may include an art sample printing facility 108 which may receive instructions from the art sample service provider 106 to print an art sample 112.

As described above, the art sample 112 may be a lower quality replica of an original art piece that is configured to degrade after a pre-determined time. It should be noted that in some embodiments the art sample service provider 106 may contain its own printing facilities to which it communicates the art sample printing instructions. In accordance with at least one embodiment, the art sample service provider 106 provides instructions to ship 110 the art sample 112 to the user 102. In accordance with at least one embodiment, the art sample service provider 106 may contain its own shipping facilities to which it provides instructions to ship the art sample 112. As described above and further described below in FIG. 2, the user may receive the art sample 112 and utilize the art sample 112 to place in a viewing space to aid in determining whether to purchase an original art piece that is associated with the art sample 112. In accordance with at least one embodiment, the art sample 112 may degrade to a blank sheet after a pre-determined time.

Figure 2:
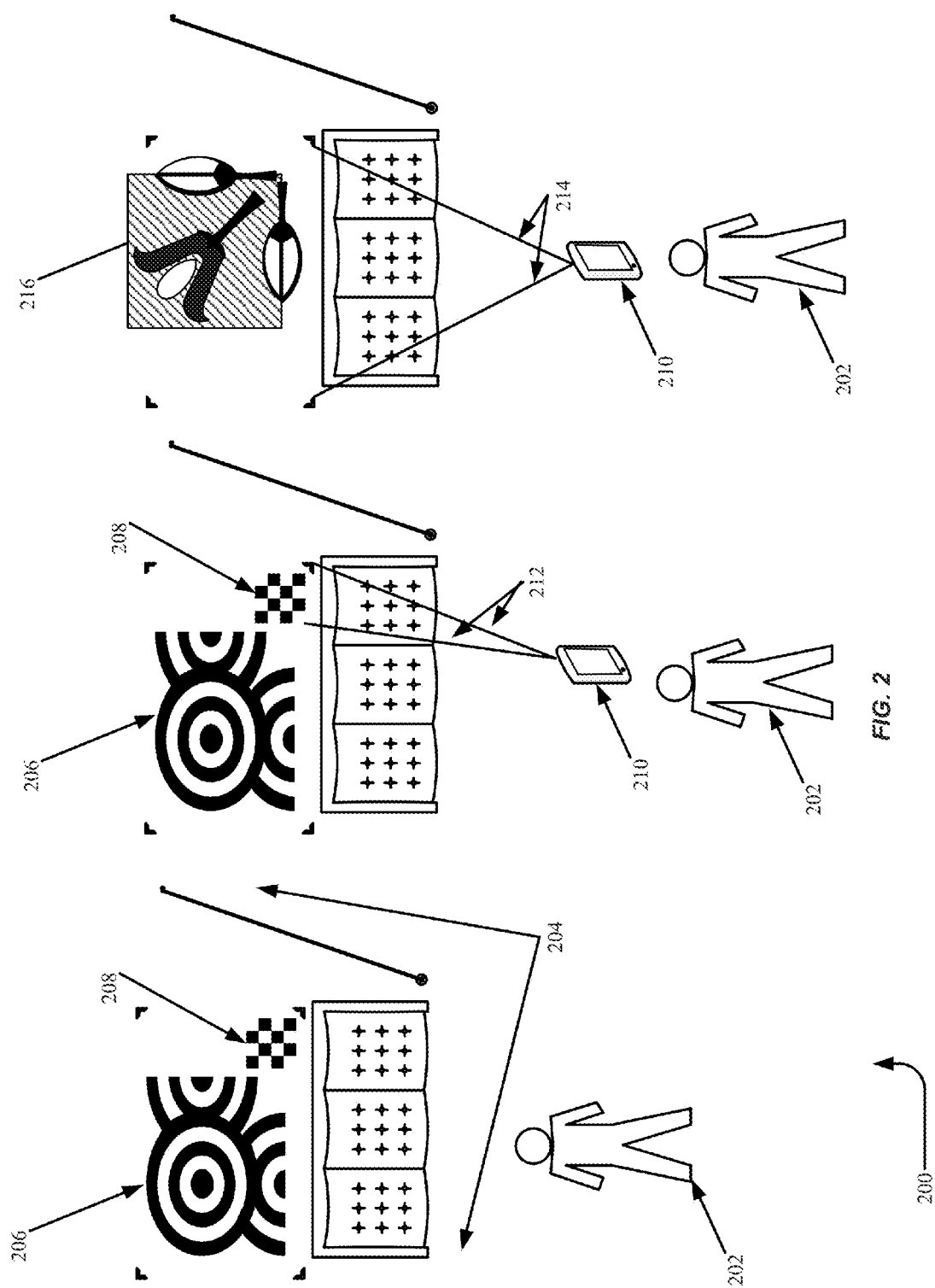
FIG. 2 is allegedly a data flow diagram illustrating an example data flow for displaying an art sample, scanning an machine-readable label, and presenting an original piece of art in place of the art sample via a computing device in accordance with at least one embodiment.

FIG. 2 depicts a data flow diagram illustrating an example data flow 200 for displaying an art sample, scanning a machine-readable label, and presenting an original piece of art in place of the art sample via a computing device in accordance with at least one embodiment. In accordance with at least one embodiment, the data flow 200 may include a user 202 looking at a viewing space 204 which includes an art sample 206 with its associated machine-readable label 208. The viewing space 204 as depicted in FIG. 2 includes a couch and a lamp as would be found in a living room of a person's house. It should be noted that the viewing space as described in the disclosure can include any space that the user wishes to place and view the art sample. In accordance with at least one embodiment, the machine-readable label 208 can include a QR code.

The art sample 206 as depicted in FIG. 2 may be a lower quality replication of an original art piece offered for sale in the electronic marketplace. As described above, the user 202 may utilize a mobile computing device 210 to interact/scan 212 the machine-readable label 208 of the art sample 206. In accordance with at least one embodiment, the user 202 may be presented for viewing 214 through the mobile computing device 210 an image representative of the original art piece 216 associated with the art sample 206. The mobile computing device 210 may utilize an application to allow the user 202 to view 214 the original art piece 216 in place of the art sample 206 upon interacting with the machine-readable label 208 of the art sample 206. As described above, the application configured to run on the mobile computing device 210 may allow the user 202 to purchase the original art piece 216 from the electronic marketplace. In accordance with at least one embodiment, the user 202 may view 214 through the mobile computing device 210 an alternative original art piece (not pictured) in place of the art sample 206 based on recommendations provided by the electronic marketplace and displayed through the application configured to run on the mobile computing device 210.

Figure 3:
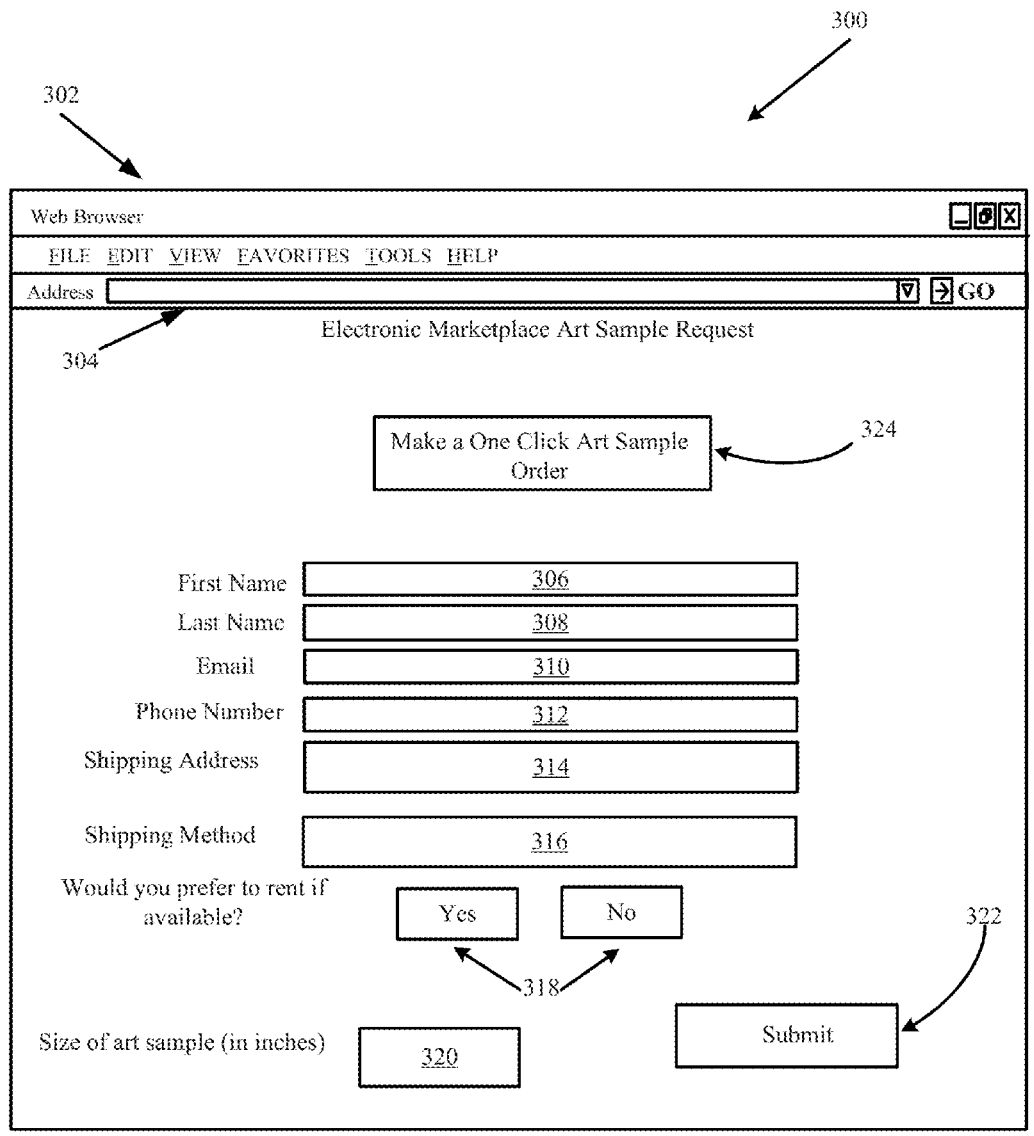
FIG. 3 is a user interface diagram illustrating aspects of an example art sample request service in accordance with at least one embodiment.

FIG. 3 depicts a user interface diagram illustrating an example art sample request web page in accordance with at least one embodiment. As shown, the illustrative web page 300 is displayed via a web-browser 302. It should be noted that while the art sample request is discussed in this example as utilizing a web page interface, any user friendly GUI configured to run on a suitable computing device may also be utilized including an application associated with the electronic marketplace, as described above. The web page 300 may include an address bar 304 with which a user may enter a uniform resource locator (URL) to be directed to an art sample request web page associated with an electronic marketplace. The web page 300 may include one or more information fields which may need to be filled out before an art sample may be shipped to the user. The one or more information fields of FIG. 3 include a user's first name 306, a user's last name 308, a user's email address 310, a user's phone number 312, a user's shipping address 314, the user's preferred method of shipping 316, an option to choose to rent the original piece of art 318, the size requested of the art sample (in inches) 320, and a submit button 322 to complete the request for an art sample from the electronic marketplace. It should be noted that while the size of the requested art sample 320 is discussed in the current example utilizing a specific unit of measurement, any suitable unit of measurement may be utilized in specifying the size of the art sample requested.

While, for the purpose of illustration, a set of information fields have been provided to allow a user to request an art sample from the electronic marketplace in FIG. 3, embodiments of the present disclosure are applicable in other contexts as well. For example, in one example, fewer or more information fields may be presented to a user to allow requesting of an art sample from the electronic marketplace. In an alternative example, certain fields may be pre-filled with information obtained from the electronic marketplace concerning the user, such as from a user profile associated with the electronic marketplace. In an example, a user enters the URL for the art sample request web page in the address bar 304 of a web browser 302 and is presented with the Electronic Marketplace Art Sample Request web page 300. In accordance with at least one embodiment, the user fills the information fields 306-318 with his/her personal identification information and the information associated with the art sample. In accordance with at least one embodiment, the user may be presented with a one click button 324 for ordering an art sample. The one click button 324 may provide the capability of obtaining or collecting all the required information required for fulfilling an order associated with an art sample for printing and delivering the art sample to the user. In accordance with at least one embodiment, a button like the one click button 324 may be provided to a user while the user is browsing for items in an electronic marketplace. For example, a user who is browsing items within an electronic marketplace may be provided with a button that will order the art sample for print and delivery to the user based on information obtained by the electronic marketplace, such as purchase and delivery information. In an example, the electronic marketplace may gather data from the user based on their browsing history through the electronic marketplace or based on previous purchases within the electronic marketplace. In accordance with at least one embodiment, the user may be presented with a recommendation to purchase the art sample upon browsing to an order web page associated with an original piece of art. Recommendations and quick order capabilities may be supplemented by data obtained from a user profile associated with the electronic marketplace. In an example, shipping and purchase information may be obtained or received from the electronic marketplace directly.

After the user has entered the information required to request an art sample he/she may click on the submit button 322 to complete the request for an art sample. In accordance with at least one embodiment, if the user selects the renting option 318, the electronic marketplace will create an art sample that is of the same quality as the original art piece (including color schema and resolution) yet contains inherit degrading properties, as described above. In an example, the user may fill the information fields 306-320 along with the rental option 318 and select the submit button 322. The electronic marketplace may ship the higher quality art sample to the user which will degrade after a pre-defined amount of time, for example 30 days. In accordance with at least one embodiment, the author or creator of the original art piece may specify the time period before total degradation of the higher quality art sample. In an example, the option to provide the author the ability to control the time period before total degradation may help reduce any copyright concerns regarding their work.

Figure 4:
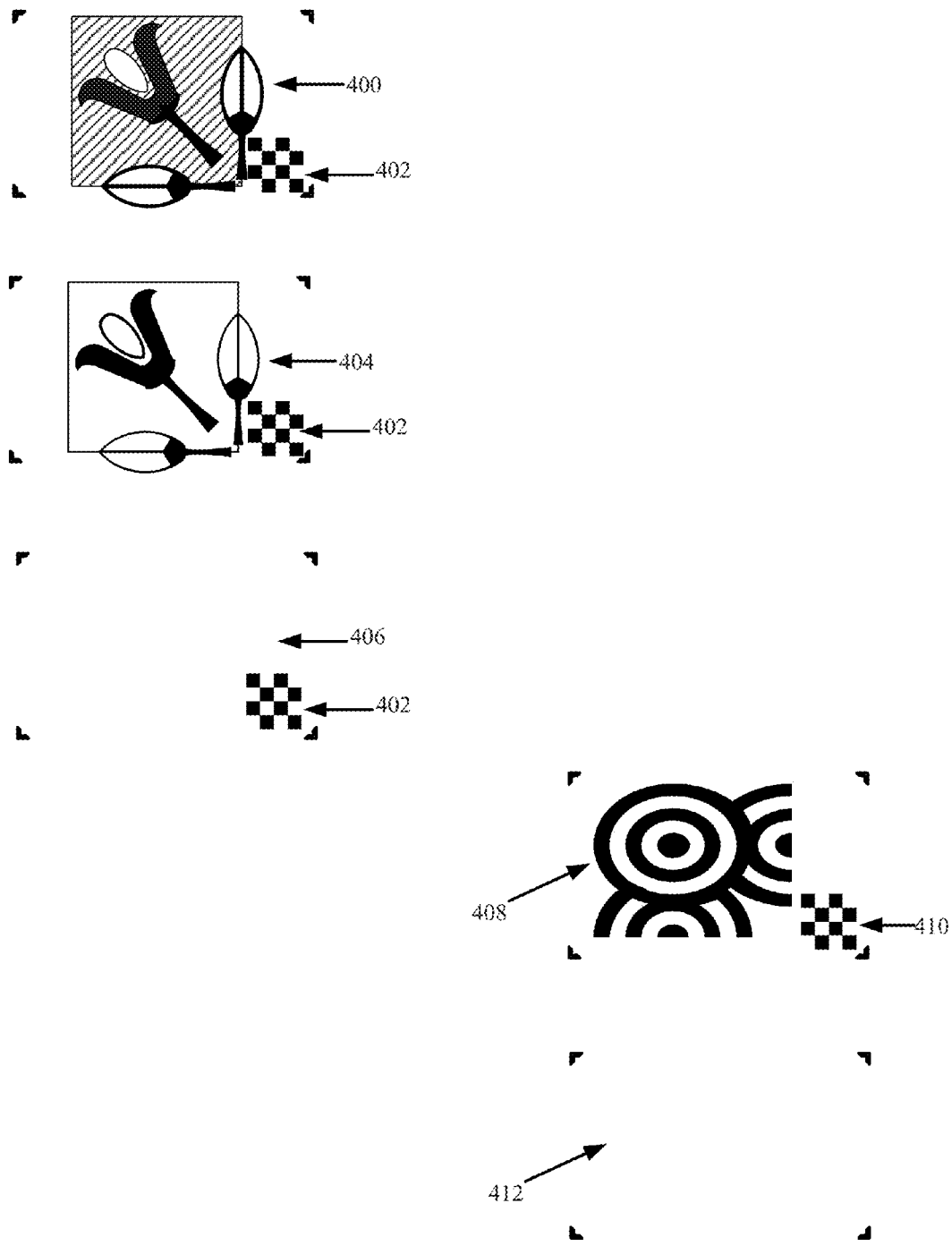
FIG. 4 illustrates example of possible degradations that can occur for art samples in accordance with at least one embodiment.
Figure 5:
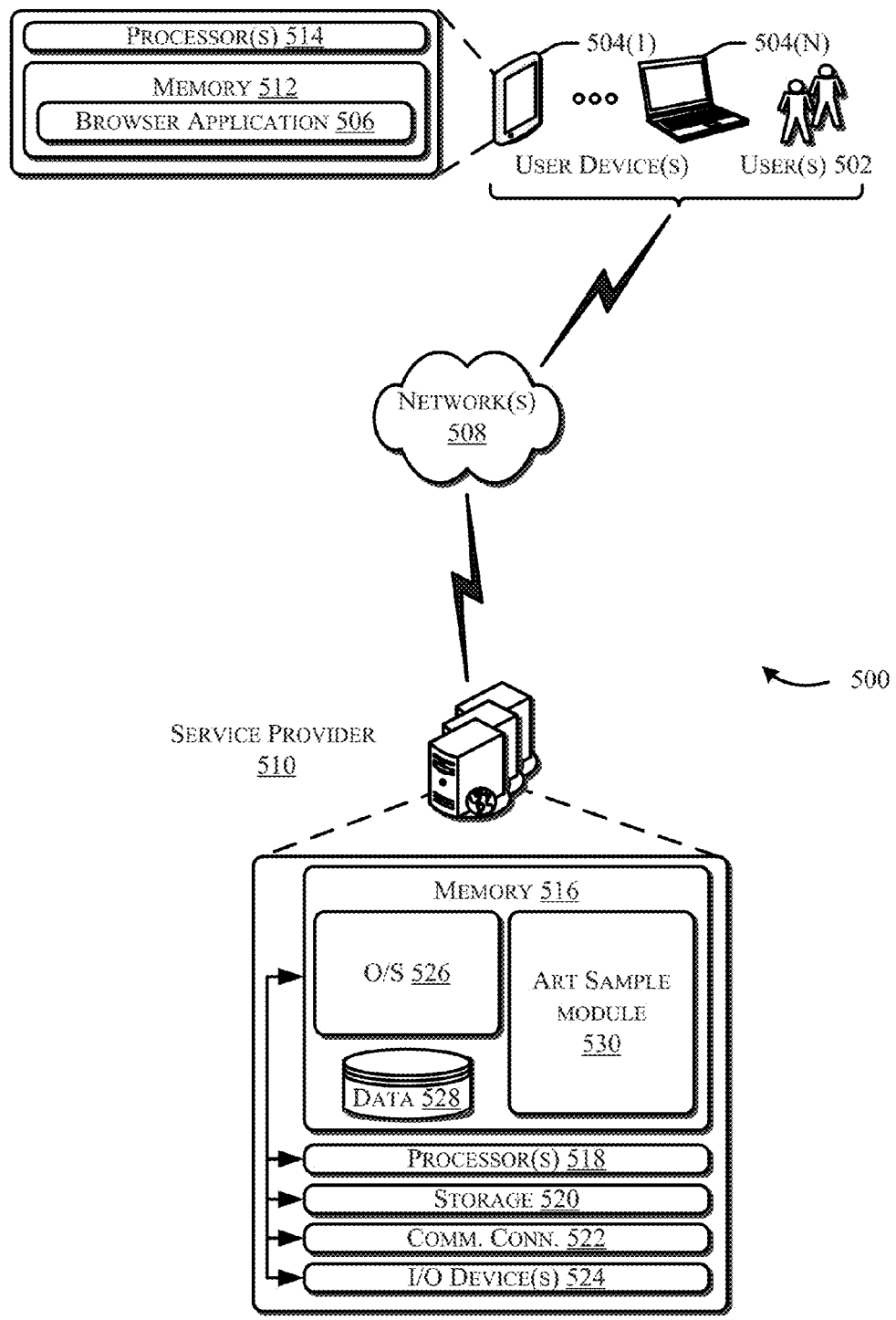
FIG. 5 is a schematic diagram depicting aspects of an example art sample service facility in accordance with at least one embodiment.

Before turning to the architecture diagram of FIG. 5, it will be helpful to have reference to examples of degradation that can occur to an art sample over a period of time as depicted in FIG. 4. FIG. 4 depicts illustrative examples of the degradation that can occur for art samples as described herein. In accordance with at least one embodiment, the user may receive an art sample 400 with an associated machine-readable label 402. In accordance with at least one embodiment, the art sample 400 may degrade over time as seen in 404. The art sample 404 depicts an art sample 400 that has lost some of its features over time. The machine-readable label 402 of art sample 404 remains in its original state. As described above and in accordance with an embodiment, the degradation can occur as the result of a thermal printing process. In one example, the image depicted in the art sample 400 may degrade because the chemical composition present on thermal paper utilized in the printing process is breaking down.

In accordance with at least one embodiment, the degradation of art sample 400 continues until the visual representation of the original art piece has completely disappeared as depicted in 406. The machine-readable label 402 remains in art sample 406 though the image of the replicated original art piece has faded away or disappeared. In accordance with at least one embodiment, after the image of the art sample has disappeared the user may be presented with textual information that was previously hidden due to the art sample. For example, the text information may include the name of the artist, the name of the original piece of art, and an associated item identification number to aid the user in ordering the original art piece that the art sample was created from. As described above, at any point during the degradation of the art sample the user may interact with the machine-readable label via a computing device to order the original art piece associated with the art sample or other original art pieces recommended by the electronic marketplace.

In accordance with at least one embodiment, the degradation can occur for both the art sample 408 and its associated machine-readable label 410. The art sample 412 depicts a complete degradation of the originally shipped art sample to the user. In accordance with at least one embodiment, the degradation depicted at 412 can occur as a result of a disappearing ink utilized to print the art sample. In an example, the degradation of the art sample and the machine-readable label may be useful in the rental scenario discussed above. For example, the user may be shipped a high quality art sample, a frame to properly display the art sample, and shipping information indicating a date to ship the materials back to the electronic marketplace. In an example, the art sample printing process may be configured to have degradation occur at a time period after the rental period. In accordance with at least one embodiment, the degradation may occur slowly beginning immediately upon printing. In an example, an art sample may maintain its original quality until a pre-defined time period after which the degradation may occur quickly. In accordance with at least one embodiment, a user who violates the rental period may be charged a fee.

FIG. 5 depicts an illustrative system and/or architecture 500 in which techniques for art sample requests and delivery may be implemented. In architecture 500, one or more users (e.g., a potential purchaser of an original art piece) 502 may utilize user computing devices 504(1)-(N) (collectively, user devices 504) to access a browser application 506 (e.g., a web browser) or a user interface (UI) accessible through the browser application 506, via one or more networks 508. The "browser application" 506 can be any suitable browser control or native application that can access and display a web page or other information. In accordance with at least one embodiment, the browser application 506 may be utilized to submit a request for an art sample or view a picture of the user's viewing space with the associated original art piece substituted for the art sample. In accordance with at least one embodiment, the user device 504 may include a separate application (not pictured) with an associated user friendly GUI to perform the same functions as the browser application 506 that includes instructions stored in memory 512. In accordance with at least one embodiment, the browser application 506 may be hosted, managed, and/or provided by a service provider 510. The one or more service provider computers 510 may, in some examples, provide computing resources such as, but not limited to, client entities, low latency data storage, durable data storage, data access, management, virtualization, cloud-based software solutions, electronic content performance management, etc. The one or more service provider computers 510 may also be operable to provide web hosting, computer application development, and/or implementation platforms, combinations of the foregoing, or the like to the one or more users 502. These service provider computers 510 may be configured to host a network site (or combination of network sites) viewable via the user device 504. The browser application 506 may be capable of handling requests from many users 502 and presenting, in response, various user interfaces on the user device 504. The browser application 506 can provide access to any type of network site that supports user interaction, including social networking sites, electronic retailers, informational sites, blog sites, search engine sites, news and entertainment sites, and so forth. The described techniques can similarly be implemented outside of the browser application 506, such as with other applications running on the user device 504.

In accordance with at least one embodiment, the one or more service provider computers 510 may be configured to receive requests for art sample, process orders for art samples and original pieces of art and providing recommendations for alternative original art pieces that are associated with an electronic marketplace. In accordance with at least one embodiment, the one or more service provide computers 510 may be configured to receive user input via the browser application 506 or an independent application configured to run on user device 504 for the processing of art samples.

In one illustrative configuration, the user devices 504 may each include at least one memory 512 and one or more processing units or processor(s) 514. The processor(s) 514 may be implemented as appropriate in hardware, computer-executable instructions, firmware, or combinations thereof. Computer-executable instruction or firmware implementations of the processor(s) 514 may include computer-executable or machine-executable instructions written in any suitable programming language to perform the various functions described. The user devices 504 may also include geo-location devices (e.g., a global positioning system (GPS) device or the like) for providing and/or recording geographic location information associated with the user devices 504.

The memory 512 may store program instructions that are loadable and executable on the processor(s) 514, as well as data generated during the execution of these programs. Depending on the configuration and type of user device 504, the memory 512 may be volatile (such as random access memory (RAM)) and/or non-volatile (such as read-only memory (ROM), flash memory, etc.). The user device 504 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 512 may include multiple different types of memory, such as static random access memory (SRAM), dynamic random access memory (DRAM), or ROM. As will be appreciated by one of skill in the art, the user devices 504 may be distributed and/or virtual.

Turning to the components of the memory 512 in more detail, the memory 512 may include an operating system and one or more application programs or services for implementing the features disclosed herein including art sample ordering and delivery associated with an electronic marketplace. Additionally, the memory 512 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 502 provided response to a security question or a geographic location obtained by the user device 504.

In some examples, the networks 508 may include any one or a combination of many different types of suitable networks, such as cable networks, the Internet, wireless networks, cellular networks and other private and/or public networks. While the illustrated example represents the users 502 accessing the browser application 506 over the networks 508, the described techniques may equally apply in instances where the users 502 interact with the one or more service provider computers 510 via the one or more user devices 504 over a landline phone, via a kiosk, or in any other suitable manner. In accordance with at least one embodiment, the described techniques may apply in other client and/or server arrangements (e.g., set-top boxes, etc.), as well as in non-client and/or server arrangements (e.g., locally stored applications, etc.).

As described briefly above, the browser application 506 may allow the users 502 to interact with the one or more service provider computers 510, such as to access web content like web pages, registration pages, or virtual representations of original art pieces displayed in a viewing space or still photograph in digital format. The one or more service provider computers 510, perhaps arranged in a cluster of servers or as a server farm, may host the browser application 506 and/or cloud-based software services. Other server architectures may also be used to host the browser application 506 and/or cloud-based software services. The browser application 506 may be capable of handling requests from many users 502 and serving, in response, various user interfaces that can be rendered at the user devices 504 such as, but not limited to, a website or web page. The browser application 506 can interact with any suitable type of website that supports user interaction, including social networking sites, electronic retailers, informational sites, blog sites, search engine sites, news and entertainment sites, and so forth. The described techniques can similarly be implemented outside of the browser application 506, such as with other applications running on the user device 504.

The one or more service provider computers 510 or the user devices 504 may be any suitable type of computing device such as, but not limited to, a mobile phone, a smart phone, a personal digital assistant (PDA), a laptop computer, a desktop computer, a server computer, a thin-client device, a tablet PC, a digital camera or video recorder, etc. Additionally, in accordance with at least one embodiment, the one or more service provider computers 510 may be executed by one or more virtual machines implemented in a hosted computing environment. The hosted computing environment may include one or more rapidly provisioned and released computing resources, which computing resources may include computing, networking, and/or storage devices. A hosted computing environment is sometimes referred to as a cloud computing environment. In some examples, the one or more service provider computers 510 may be in communication with the user device 504 via the networks 508, or via other network connections. The one or more service provider computers 510 may include one or more servers, perhaps arranged in a cluster or as individual servers not associated with one another.

In one illustrative configuration, the one or more service provider computers 510 may include at least one memory 516 and one or more processing units or processors(s) 518. The processor(s) 518 may be implemented as appropriate in hardware, computer-executable instructions, firmware, or combinations thereof. Computer-executable instruction or firmware implementations of the processor(s) 518 may include computer-executable or machine-executable instructions written in any suitable programming language to perform the various functions described. The memory 516 may store program instructions that are loadable and executable on the processor(s) 518, as well as data generated during the execution of these programs. Depending on the configuration and type of the one or more service provider computers 510, the memory 516 may be volatile (such as RAM) and/or non-volatile (such as ROM, flash memory, etc.). The one or more service provider computers 510 or servers may also include additional storage 520, which may include removable storage and/or non-removable storage. The additional storage 520 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 516 may include multiple different types of memory, such as SRAM, DRAM, or ROM.

The memory 516, the additional storage 520, both removable and non-removable, are all examples of computer-readable storage media. For example, computer-readable storage media may include volatile or non-volatile, removable or non-removable media implemented in any suitable method or technology for storage of information such as computer-readable instructions, data structures, program modules, or other data. The memory 516 and the additional storage 520 are all examples of computer storage media. Additional types of computer storage media that may be present in the one or more service provider computers 510 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other suitable medium which can be used to store the desired information and which can be accessed by the one or more service provider computers 510. Suitable combinations of any of the above should also be included within the scope of computer-readable media. Alternatively, computer-readable communication media may include computer-readable instructions, program modules, or other data transmitted within a data signal, such as a carrier wave, or other transmission. However, as used herein, computer-readable storage media does not include computer-readable communication media.

The one or more service provider computers 510 may also contain communication connection(s) 522 that allow the one or more service provider computers 510 to communicate with a stored database, another computing device or server, user terminals and/or other devices on the networks 508. The one or more service provider computers 510 may also include I/O device(s) 524, such as a keyboard, a mouse, a pen, a voice input device, a touch input device, a display, speakers, a printer, etc.

Turning to the contents of the memory 516 in more detail and as will be described in further detail with reference to FIG. 6, the memory 516 may include an operating system 526, one or more data stores 528, and/or one or more application programs or services for implementing the features disclosed herein including an art sample module 530. In accordance with at least one embodiment, the art sample module 530 may be responsible for receiving requests for art samples, providing instructions to print and ship an art sample with associated degradation information to the user via a web browser 506. In accordance with at least one embodiment, a user 502 may enter the URL for the art sample request web page associated with an electronic marketplace into a browser application 506 via a user device 504. The user may then submit a request for an art sample via the browser application 506 or as depicted in FIG. 3 and the service will identify the requested art sample and provide instructions to print and ship the art sample to the user via the art sample module 530. In accordance with at least one embodiment the user 502 may interact with the art sample's machine-readable label via a user device 504 to be presented with the associated original art piece via the art sample module 530 in communication with the user device 504. In accordance with at least one embodiment, the user 502 may be presented with a virtual representation of their viewing space, such as their living room, with the art sample replaced by the associated original art piece or alternative art pieces which were recommended by an associated electronic marketplace via the art sample module 530 in communication with the user device 504 via networks 508. In accordance with at least one embodiment, the one or more data stores 528 may store the ordering information associated with the art sample, a profile for the user 502, or degradation information associated with the art sample. In accordance with at least one embodiment, the information stored on the one or more data stores 528 may be stored in one or more third party computers (not shown). In accordance with at least one embodiment, the art sample module 530 may be configured to communicate with the browser application 506 via the networks 508 to receive user input via the user device 504 in order to place requests for art samples, order original pieces of art, view recommended original pieces of art, present virtual viewing spaces that the user can interact with according to the art sample service.

Figure 6:
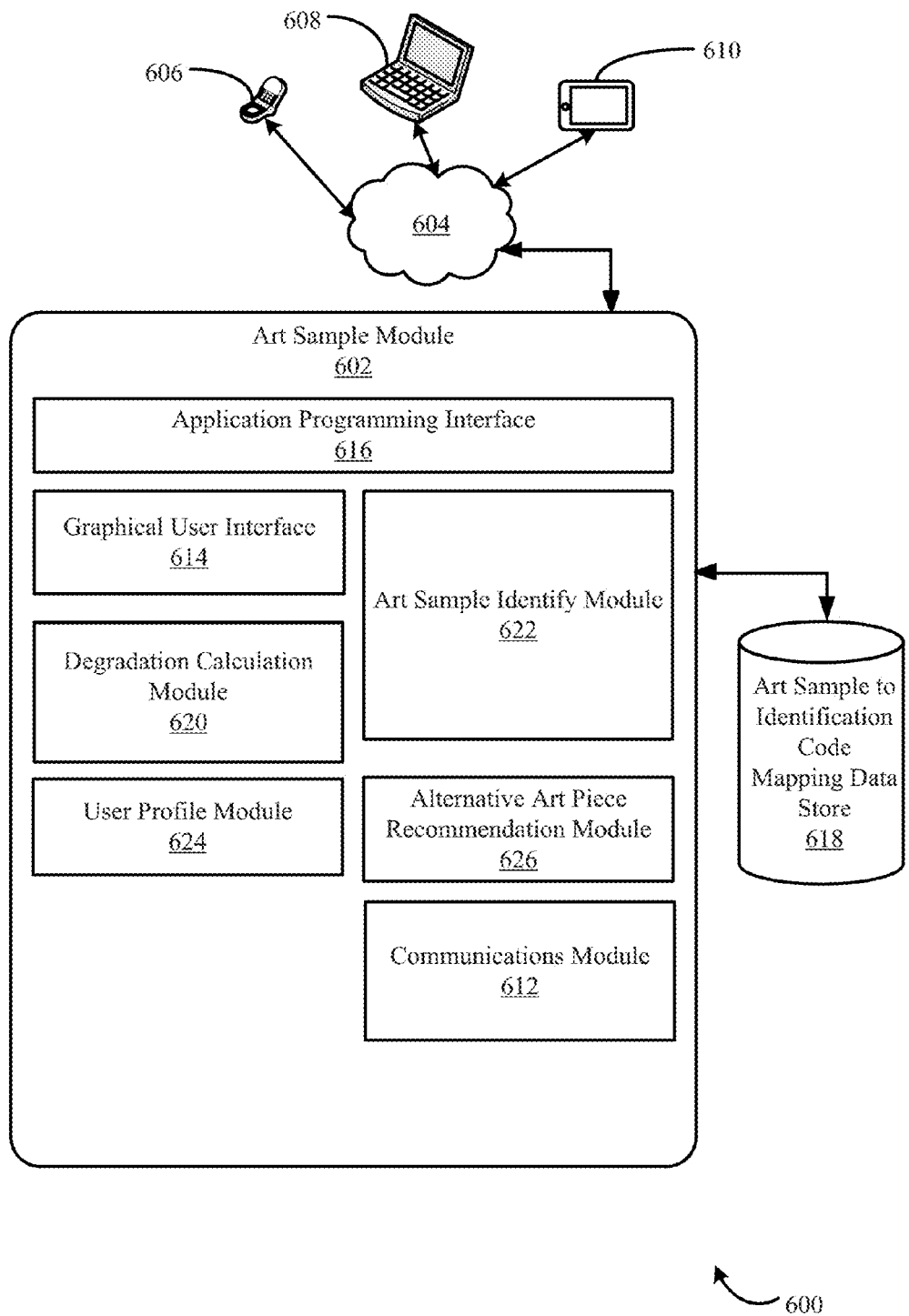
FIG. 6 is a schematic diagram depicting aspects of an example art sample service module in accordance with at least one embodiment.

FIG. 6 illustrates a schematic example of a computer architecture 600 for receiving requests for art samples, providing instructions to print and ship the art samples with corresponding machine-readable labels, and receiving indications or information of interactions from a user device and the machine-readable label to provide purchase capability and recommendations to the user via the computer device. The art sample module 602 may be an example of art sample module 530 from FIG. 5. The modules included within and including the art sample module 602 may be software modules, hardware modules or a suitable combination thereof. If the modules are software modules, the modules can be embodied on a non-transitory computer readable medium and processed by a processor in any of the computer systems described herein. It should be noted that the described processes and architectures described below can be performed either in real-time or in an asynchronous mode prior to any user interaction. The modules may be configured in the manner suggested in FIG. 6 or may exist as separate modules.

In accordance with at least one embodiment, a user or potential purchaser may submit a request or communicate a request for an art sample to an electronic marketplace for printing and shipping utilizing a mobile phone device 606, a laptop computer 608, or a tablet personal computer 610 via networks 604 and communications module 612 to the art sample module 602. The networks 604 may be an example of the one or more networks 508 (as shown in FIG. 5). In accordance with at least one embodiment a graphical user interface 614 may be presented to the user 502 to allow the user to request an art sample. In accordance with at least one embodiment, user input regarding art sample requests, purchase information, interaction with a virtual viewing space, or responses to recommendations may be received utilizing an application programming interface 616 of the art sample request service described herein. In accordance with at least one embodiment and as described above, a request for an art sample may be received from a user. In accordance with at least one embodiment, the art sample service may provide a recommendation that the user purchase the art sample via the graphical user interface 614 or user devices 504. In accordance with at least one embodiment, the user's art sample request information, original art piece ordering information, alternative original art piece recommendations, art sample degradation information, machine-readable label mapping data, and user profile information may be stored in one or more data stores 618. In accordance with at least one embodiment, the information stored on the one or more data stores 618 may be dynamically updated or modified by an associated electronic marketplace or authorized administrator. In accordance with at least one embodiment, the information stored on the one or more data stores 618 may be dynamically updated based on user data. In accordance with at least one embodiment, the art sample request service may create the user profile based on the user's browsing history within the electronic marketplace or the art samples or purchases previously made. In accordance with at least one embodiment, the user profile may be utilized by the service to prefill or pre-select fields within the user interface to provide a more efficient art sample request process associated with the electronic marketplace.

In accordance with at least one embodiment, the art sample module 602 may contain a degradation calculation module 620, an art sample identify module 622, a communications module 612, a user profile module 624, and an alternative art piece recommendation module 626. In accordance with at least one embodiment, a user may request or provide an indication in response to a recommendation for an art sample as described above. In accordance with at least one embodiment, the user may request an art sample via the user devices 606-610 in communication with the art sample module 602 via networks 604 and the graphical user interface 614 and API 616. In accordance with at least one embodiment, the art sample module 602 may utilize the communications module 612 to communicate with the user profile module 624 to gather order information or create a user profile for a first time user. In accordance with at least one embodiment, the art sample module may obtain the degradation information and relevant order data from the one or more data stores 618. In accordance with at least one embodiment, the degradation calculation module 620 may be accessed by the art sample module 602 to provide printing instructions to a printer associated with the art sample service (not pictured) via the communications module 612. The degradation calculation module 620 may be responsible for calculating the chemical composition present on the thermal paper utilized by the thermal printing process in order to have degradation occur at a pre-defined time. In accordance with at least one embodiment, the degradation calculation module 620 may provide general instructions for the thermal printing process depending on the material utilized to print the art sample. In accordance with at least one embodiment, the degradation calculation module 620 may be responsible for determining the type of ink to utilize in the art sample printing process to provide disappearing ink capability for the art samples. In accordance with at least one embodiment, the art sample module 602 may be responsible for providing shipping instructions of the art sample to the user via information submitted by the user utilizing user devices 606-610 and the user profile module 624 in conjunction with an art sample request web page such as that described above in FIG. 3.

In accordance with at least one embodiment, after the user has received their art sample, the user may interact with the machine-readable label included with the art sample as seen in FIG. 2 to be presented with various viewing and interactive capabilities. In accordance with at least one embodiment, the user may utilize a user device such as user devices 606-610 to interact with the machine-readable label included with the art sample. In accordance with at least one embodiment, in response to the interaction between the user devices 606-610 and the machine-readable label, the art sample module 602 may interact with the graphical user interface 614, the art sample identify module 622, the alternative art piece recommendation module 626, and the one or more data stores 618 to provide various visual representations of the original art piece associated with the art sample to the user when viewed through the user devices 606-610. In accordance with at least one embodiment, the user may utilize device 606 to scan or interact with a machine-readable label included with the art sample such as a QR code. In response to the QR code scanning, the art sample identify module 622 may communicate with the one or more mapping data stores 618 to obtain an image of the original art piece that is associated with the art sample.

The original art piece image may be communicated to the user in place of the art sample when viewed through the user device 606 via the graphical user interface 614, the API 616, and the art sample module 602. In accordance with at least one embodiment, the user may interact with a GUI or independent application configured to communicate with art sample module 602 to provide a virtual viewing experience to the user. For example, in response to receiving an indication of the interaction between the user device and the machine-readable label, the user may be presented for viewing through their device 606 a virtual viewing space that may correspond to their current viewing space such as the user's living room. The virtual viewing space may be created utilizing a picture captured by the user device 606 and communicated to the art sample module 602, graphical user interface 614, and the art sample identify module 622. The virtual viewing space may be interacted with by the user utilizing the device 606 in communication with the graphical user interface 614. For example, the user may wish to move the image representative of the original art piece around the virtual space to get an idea of where it would look better. In accordance with at least one embodiment, an augmented reality viewing space may be created for the user utilizing the user device 606 and communicated to the art sample module 602, graphical user interface 614, and the art sample identify module 622. The augmented reality viewing space may allow the user to move their user device around their current physical space and in real time create new viewing spaces with the image of the original art piece present utilizing the modules described above. As used herein, the phrase "augmented reality" can refer to an ostensible representation of superimposing a computer-generated image on a user's view of the real world as the user is presented with a computer-generated image of a viewing space that may update in real time but only when viewed through the computing device. In accordance with at least one embodiment, the user may communicate a still photograph of the art sample, via the user devices 606-610, to the art sample module 602. In accordance with at least one embodiment, the art sample module 602, the graphical user interface 614, and the art sample identify module 622 in communication with the one or more data stores 618 may present to the user the same photograph with an image of the original art piece replacing the art sample.

In accordance with at least one embodiment, the art sample service, which may be associated with an electronic marketplace, may present recommendations of alternative original art pieces to the user utilizing the art sample module 602, the graphical user interface 614, the alternative art piece recommendation module 626 and the user devices 606-610. For example, the user may indicate that they would like to view alternative art pieces other than the art piece that is associated with the shipped art sample via the GUI presented to them on user devices 606-610. The art sample service may provide other images representative of the alternative original art piece recommendations in place of the art sample to the user when viewed through the user devices 606-610. In accordance with at least one embodiment, the alternative art piece recommendation module 626 may base the recommendations of alternative art samples on feedback obtained from the user. For example, if a user has previously indicated that he/she does not enjoy art samples associated with a particular art style, the alternative art piece recommendation module 626 may exclude art samples associated with the particular art style. In accordance with at least one embodiment, the graphical user interface 614 and art sample module 602 may allow the user to interact with the newly presented alternative original art pieces in a similar fashion as that described above with reference to the virtual viewing space and still photograph implementations. In accordance with at least one embodiment, the art sample module 602 in communication with the user profile module 624, the graphical user interface 614, and the communication module 612 may be responsible for processing orders for the original art piece associated with the art sample upon an order request received from a user. In accordance with at least one embodiment, the user may interact with the machine-readable label included with the art sample and be presented a purchase option for the original art piece associated with the art sample. In an example, the user may also purchase alternative original art pieces that have been recommended by the art sample service associated with an electronic marketplace. In accordance with at least one embodiment, the art sample module 602 may in conjunction with the user profile module 624 provide instructions for printing the original art piece and providing instructions to ship the original art piece to the user via communications with an associated electronic marketplace utilizing the communications module 612. In accordance with at least one embodiment, shipping information may be obtained from a GPS device located on the user's computing device.

In accordance with at least one embodiment, the data associated with the art sample or the original piece of art from which the art sample is derived may be provided to the user. For example, a data file including the information required to present the art sample/original piece of art may be communicated to the user for printing utilizing his/her own printing device. In accordance with at least one embodiment, the art sample/original piece of art may be provided to the user in a file format for utilization with a computing device with projecting capabilities. For example, the art sample service may provide a data file to the user which the user may interact with using a computing device. The computing device may be configured to project the art sample on a surface of the users choice in dimensions that are approximate to the physically shipped art sample discussed above. In accordance with at least one embodiment, the art sample module 602 in conjunction with the art sample identify module 622, the one or more data stores 618, the user profile module 624, and the degradation calculation module 620 may be responsible for providing the art sample/original piece of art to the user for user initiated printing or projection display. In accordance with at least one embodiment, the information required to present the art sample, either in the form of printing instructions or a file format for projection, may include degradation information obtained from the degradation calculation module 620. For example, the data file provided to the user for projecting may be configured to slowly degrade until a computing device is no longer capable of interacting with it. In an example, the data file may only be utilized for a certain time period before it is locked via internal locking mechanisms.

In accordance with at least one embodiment, the art sample module 602 in conjunction with the graphical user interface 614 and the degradation calculation module 620, and the one or more data stores 618 may be responsible for receiving and collating degradation information specifics communicated by the author or creator of the original piece of art or the electronic marketplace. In accordance with at least one embodiment, the art sample module 602 in communication with an associated electronic marketplace may pre-determine the type and time before degradation occurs according to a maintained set of standards. In accordance with at least one embodiment, the creator of the original art piece that opts-in to the art sample program may specify the quality of the art sample to be utilized and the type of and timing before degradation occurs for the associated art samples. The author or creators specifications for the quality of the art sample and the degradation to occur may be stored in the one or more data stores 618 and utilized by the degradation calculation module 620.

Figure 7:
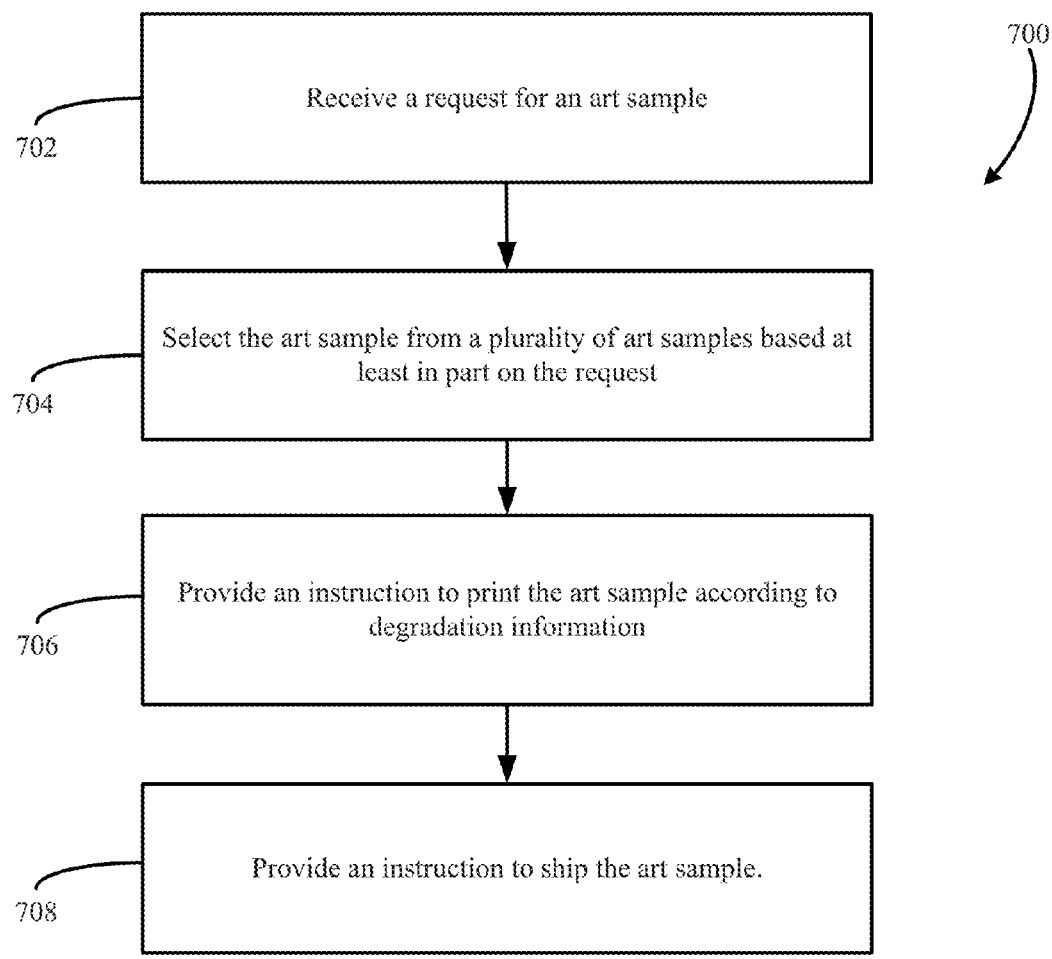
FIG. 7 is a flow chart illustrating an example data flow for an art sample service in accordance with at least one embodiment.
Figure 8:
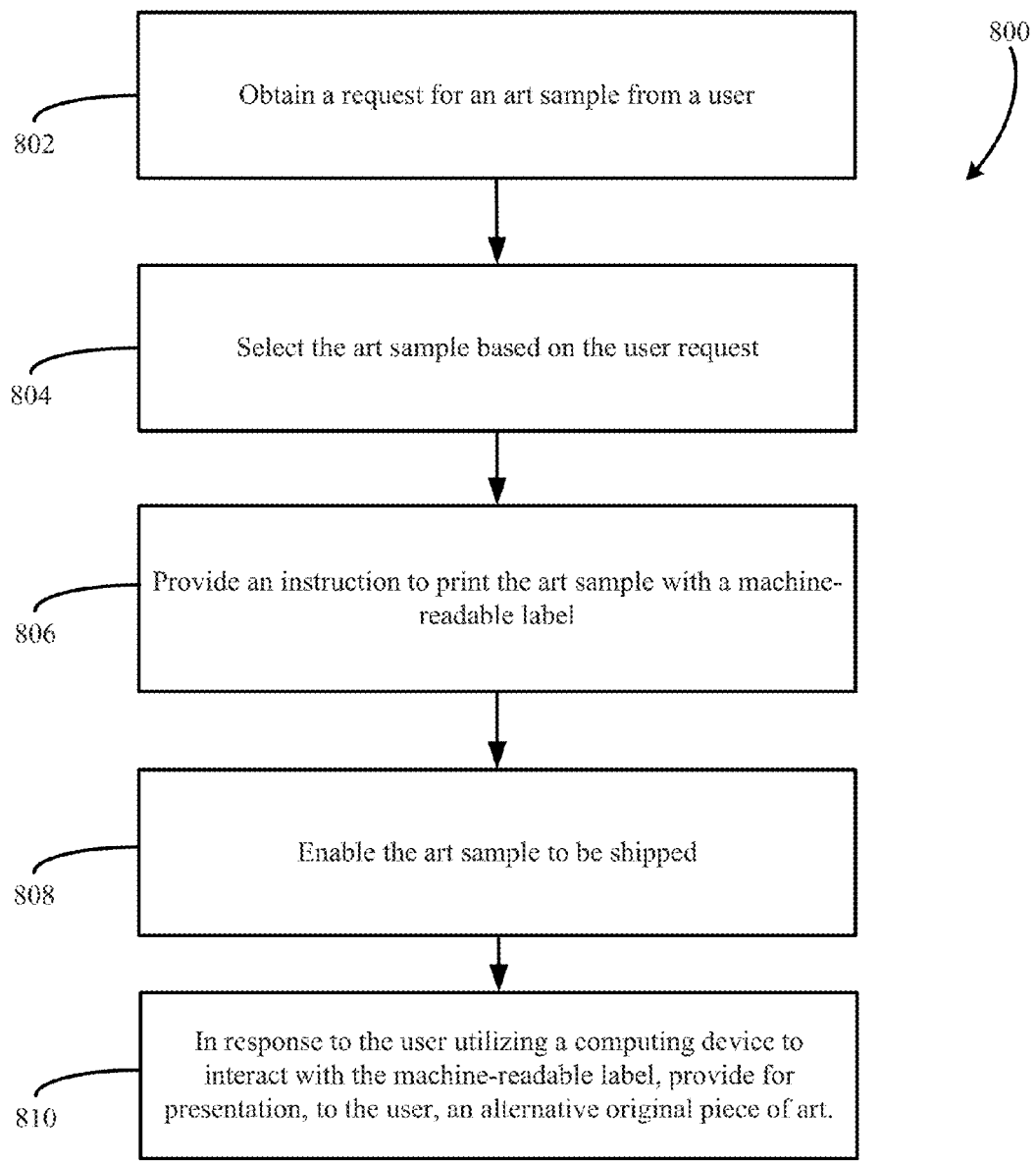
FIG. 8 is a flow chart illustrating an example data flow for an art sample service including presenting an alternative original piece of art.
Figure 9:
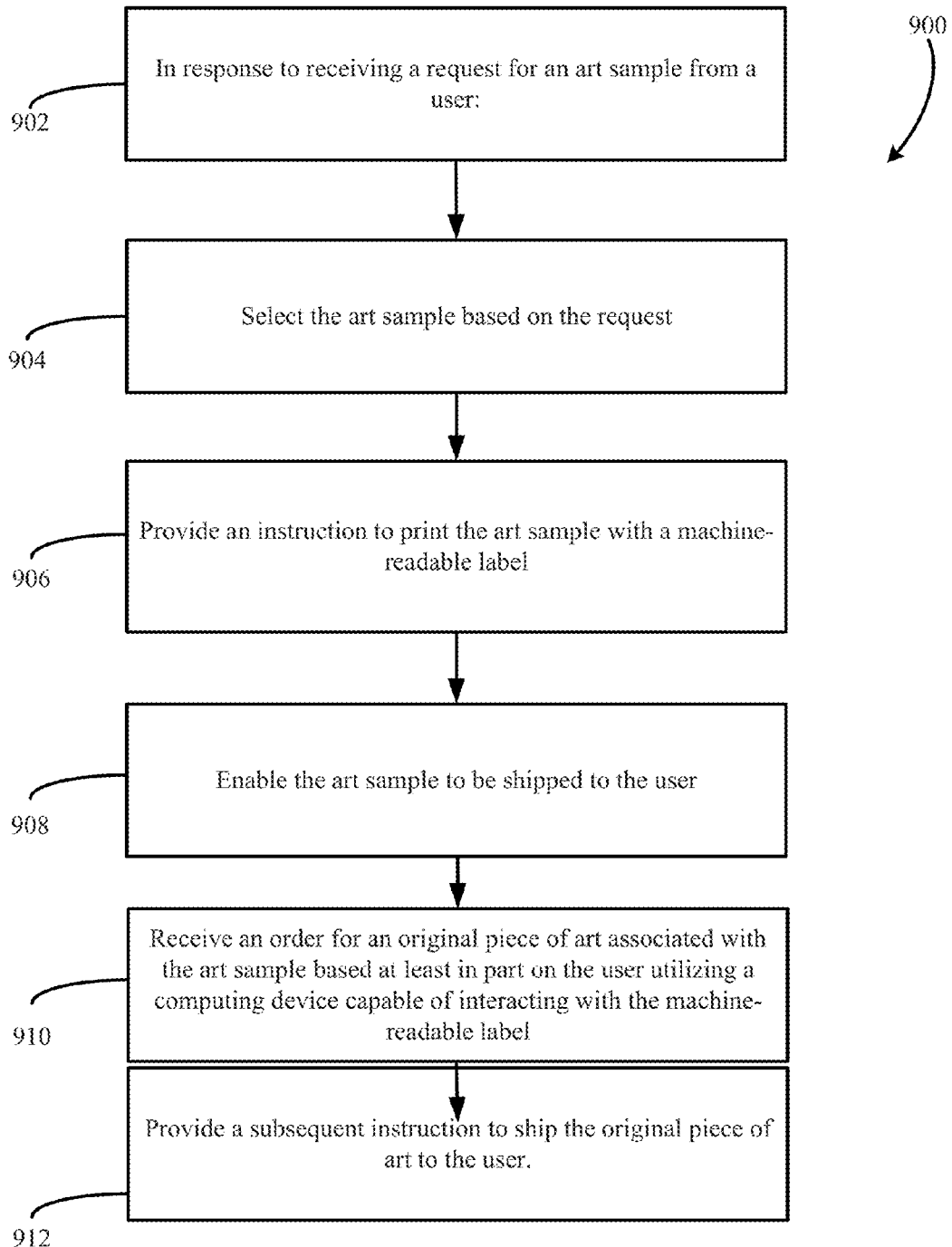
FIG. 9 is a flow chart illustrating an example data flow for an art sample service including receiving an order for an original piece of art associated with the art sample and providing instructions to ship the original piece of art to the user.

FIGS. 7-9 illustrate example flow diagrams showing respective process 700, 800, and 900 for submitting a request for an art sample and providing instructions to print and ship the art sample, associated with an electronic marketplace, provide for presentation an alternative original piece of art, and receive an order for the original piece of art associated with the art sample and provide further instructions to ship the original piece of art to the user, according to at least a few examples.

These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any suitable number of the described operations can be combined in any suitable order and/or in parallel to implement the processes.

Additionally, some, any, or all of the process (or any other suitable process described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. In accordance with at least one embodiment, the code may be stored on a computer-readable storage medium, for example, in the form of a computer program comprising a plurality of instructions executable by one or more processors. The computer-readable storage medium may be non-transitory.

In some examples, the one or more service provider computers 510 (e.g., utilizing at least the art sample module 602, the degradation calculation module 620, the art sample identify module 622, the communications module 612, the user profile module 624, and the one or more data stores 618) shown in FIGS. 5 and 6 may perform the process of FIG. 7. The process 700 may progress at 702 by receiving a request for an art sample. As described above, the user may request an art sample by utilizing an art sample request web page as described in FIG. 3. In accordance with at least one embodiment, the art sample request may be processed by the art sample module 602, the user profile module 624, and the degradation calculation module 620.

The process 700 may continue at 704 by selecting the art sample and its associated degradation information from a plurality of art samples based least in part on the request. As described above, the art sample module 602, the art sample identify module 622, and the one or more data stores 618 may be responsible for selecting the appropriate art sample based on the users request. In accordance with at least one embodiment, the degradation calculation module 620 may be responsible for associating the degradation information or correlating the associated degradation information with the art sample before instructions are provided for printing and shipping. The process 700 may proceed at 706 by providing instructions to print the art sample according to the degradation information. As described above, the art sample module 602, the degradation calculation module 620, and the art sample identify module 622 and the one or more data stores 618 may be responsible for providing instructions to print the requested art sample according to the associated degradation information. The degradation information may include an indication of the type of printing process to utilize for the particular art sample, the time before degradation is to occur, and the quality of the art sample. The process 700 may conclude at 708 by providing instructions to ship the requested art sample to the user. As described above, the art sample module 602, the user profile module 624, the communications module 612, and the one or more data stores 618 may be responsible for providing instructions to an associated electronic marketplace to ship the printed art sample to the user. In accordance with at least one embodiment, the shipping instructions may include a time period to accord to the associated degradation information. For example, if an author has requested that degradation occur quickly upon creation of the art sample, the shipping may be expedited to the user.

In some examples, the one or more service provider computers 510 (e.g., utilizing at least the art sample module 602, the degradation calculation module 620, the art sample identify module 622, the communications module 612, the user profile module 624, the alternative art piece recommendation module 626, and the one or more data stores 618) shown in FIGS. 5 and 6 may perform the process of FIG. 8. The process 800 may progress at 802 by obtaining a request for an art sample. As described above, the service may obtain a request from a user for an art sample in response to the user utilizing an art sample request web page as described in FIG. 3. In accordance with at least one embodiment, the art sample request may be processed by the art sample module 602, the user profile module 624, and the degradation calculation module 620.

The process 800 may continue at 804 by selecting the art sample based at least in part on the user request. As described above, the art sample module 602, the art sample identify module 622, and the one or more data stores 618 may be responsible for selecting the appropriate art sample based on the users request. The process 800 may proceed at 806 by providing instructions to print the art sample with a machine-readable label. In accordance with at least one embodiment, the art sample printing instructions may also include degradation information that can be utilized during the printing process to ensure the art sample will degrade after a pre-determined time, as described above in FIG. 6. As described above, the art sample module 602, the art sample identify module 622 and the one or more data stores 618 may be responsible for providing instructions to print the requested art sample with the machine-readable label. In accordance with at least one embodiment, the machine-readable label may be interacted with by a computing device to communicate information to the art sample service, including an identifier for the original art piece associated with the art sample, information concerning the user's profile associated with an electronic marketplace, the author of the original art piece, or shipping information to aid in processing an order for the original art piece. The process 800 may continue at 808 by enabling the art sample to be shipped to the user. As described above, the art sample module 602, the user profile module 624, the communications module 612, and the one or more data stores 618 may be responsible for providing instructions to an associated electronic marketplace to ship the printed art sample to the user. The process 800 may conclude at 810 by providing for presentation an alternative original piece of art to the user in response to the user utilizing a computing device to interact with the machine-readable label as described above in FIGS, 2 and 6. As described above, the art sample module 602, the user profile module 624, the communications module 612, the alternative art piece recommendation module 626, and the one or more data stores 618 may be responsible for presenting the alternative original piece of art to the user. In accordance with at least one embodiment, in response to the user interacting with the machine-readable label included with a shipped art sample, the user may be presented various recommendations of alternative original art pieces to view in place of the art sample. As described above, the user may view and interact with the recommendations via an application configured to run on the computing device. In accordance with at least one embodiment, the graphical user interface 614, the API 616, and the art sample module 602 may be responsible for providing the alternative original art pieces to the user.

In some examples, the one or more service provider computers 510 (e.g., utilizing at least the art sample module 602, the graphical user interface 614, the degradation calculation module 620, the art sample identify module 622, the communications module 612, the user profile module 624, and the one or more data stores 618) shown in FIGS. 5 and 6 may perform the process of FIG. 9. The process 900 may progress at 902 by receiving a request for an art sample from a user. As described above, the user may request an art sample by utilizing an art sample request web page as described in FIG. 3. In accordance with at least one embodiment, the art sample request may be processed by the art sample module 602, the user profile module 624, and the degradation calculation module 620.

The process 900 may continue at 904 by selecting the art sample based least in part on the request. As described above, the art sample module 602, the art sample identify module 622, and the one or more data stores 618 may be responsible for selecting the appropriate art sample based on the users request. The process 900 may proceed at 906 by providing instructions to print the art sample with a machine-readable label. In accordance with at least one embodiment, the machine-readable label may be interacted with by a computing device to communicate information to the art sample service, including an identifier for the original art piece associated with the art sample, information concerning the user's profile associated with an electronic marketplace, the author of the original art piece, or shipping information to aid in processing an order for the original art piece. As described above, the art sample module 602, the art sample identify module 622 and the one or more data stores 618 may be responsible for providing instructions to print the requested art sample with a machine-readable label. In accordance with at least one embodiment, the art sample printing instructions may also include degradation information that can be utilized during the printing process to ensure the art sample will degrade after a pre-determined time, as described above in FIG. 6. The process 900 may continue at 908 by enabling the art sample to be shipped to the user. As described above, the art sample module 602, the user profile module 624, the communications module 612, and the one or more data stores 618 may be responsible for providing instructions to an associated electronic marketplace to ship the printed art sample to the user.

The process 900 may proceed at 910 by receiving an order for an original piece of art associated with the art sample based at least in part on the user utilizing a computing device capable of interacting with the machine-readable label. As described above, the art sample module 602, the user profile module 624, the communications module 612, the graphical user interface 614, and the one or more data stores 618 may be responsible for receiving an order for the original piece of art associated with the art sample. In accordance with at least one embodiment, the art sample identify module 622 may communicate with the one or more data stores 618 to identify the original art piece associated with the art sample in response to the user interacting with the machine-readable label. Further, the art sample module 602 and the user profile module 624 may determine the shipping address of the user based on a previously created user profile associated with an electronic marketplace or based off the user's art sample request. The process 900 may conclude at 912 by providing a subsequent instruction to ship the original piece of art to the user. As described above, the art sample module 602, the user profile module 624, the communications module 612, and the one or more data stores 618 may be responsible for providing instructions to an associated electronic marketplace to ship the original piece of art that is associated with the art sample to the user.

Figure 10:
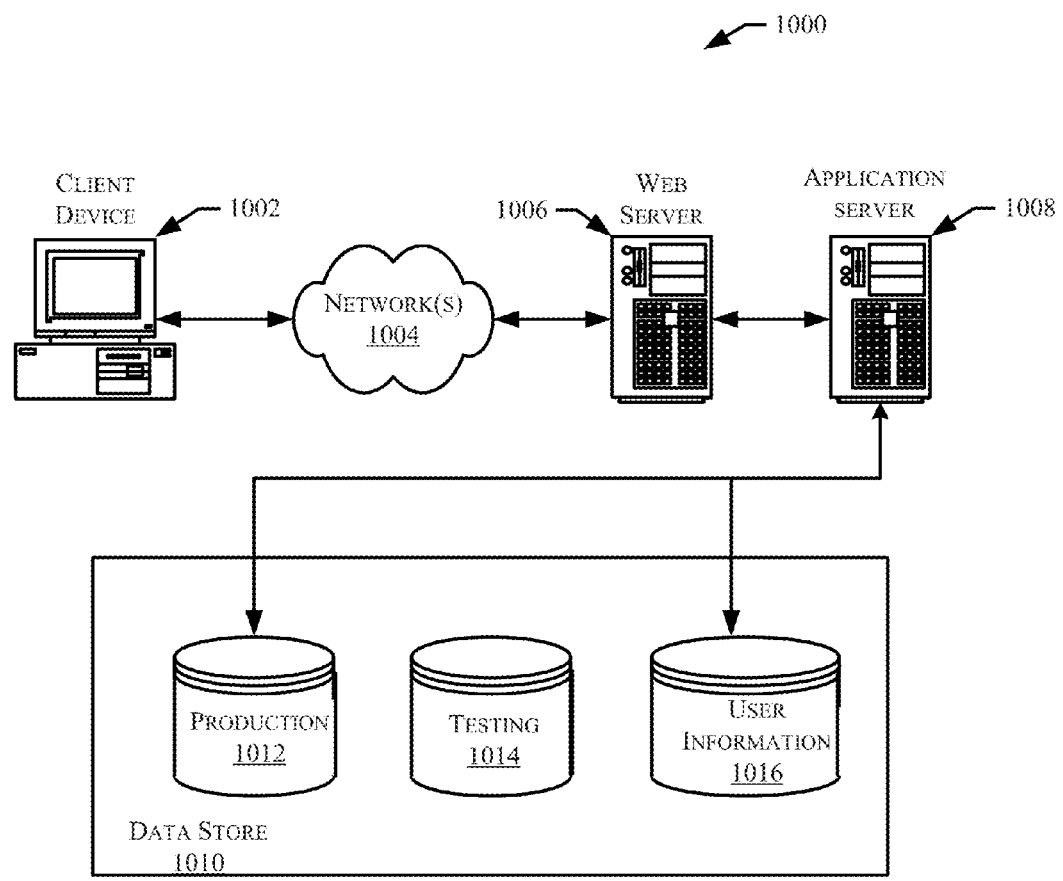
FIG. 10 is a schematic diagram illustrating aspects of an example environment in which various embodiments of the art sample service can be implemented in accordance with at least one embodiment.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of Hypertext Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server (s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "or" is to be construed as inclusive, so that "A or B" means "A or B or both," unless otherwise indicated herein or clearly contradicted by context. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computing system, a request, from a user device of a user, for information associated with a piece of art available in an electronic marketplace;
   obtaining, by the computing system, degradation information and quality information associated with the piece of art that is available in the electronic marketplace, the degradation information and the quality information being specified by a creator of the piece of art, the quality information indicating a quality with which an art sample is to be printed, and the degradation information indicating a time period before degradation of the art sample occurs;
   determining, by the computing system, printing attributes for the art sample based at least in part on the request for the information associated with the piece of art, the quality information, and the degradation information, wherein the art sample is a physically degrading replication of the piece of art, wherein the degrading comprises degradation of ink utilized to print the art sample, degradation of materials utilized to print the art sample, or combinations thereof, with respect to the time period indicated by the degradation information;
   selecting a machine-readable identifier to incorporate into the art sample;
   providing, by the computing system, an instruction to print the art sample according to the printing attributes of the art sample utilizing the ink, the materials, or combinations thereof indicated by the degradation information;
   printing, by the computing system, the art sample according to the printing attributes of the art sample utilizing the ink, the materials, or combinations thereof indicated by the degradation information;
   providing, by the computing system, instructions enabling the art sample to be shipped to the user according to shipping information;
   receiving an indication of an interaction between the user device of the user and the machine-readable identifier;
   upon receipt of the indication of the interaction between the user device of the user and the machine-readable identifier, presenting, via an augmented reality application interacting with the user device, an image representative of the piece of art that is superimposed over the art sample in a view of the art sample through the user device; and
   receiving input, from the user device, comprising a request to reposition the image representative of the piece of art in the view of the art sample through the user device.

2. The computer-implemented method of claim 1, further comprising:
   generating a recommendation for one or more alternative pieces of art based on feedback obtained from the user; and
   presenting, via the augmented reality application, an image for each of the one or more alternative pieces of art that is superimposed over the art sample in the view of the art sample through the user device.

3. The computer-implemented method of claim 2, wherein the machine-readable identifier is configured to degrade over time after expiration of the time period indicated by the degradation information associated with the piece of art.

4. A non-transitory computer-readable storage medium having stored thereon computer-executable instructions that, when executed by one or more processors of a computer system, cause the computer system to perform operations comprising:
   receiving, from a user device of a user, a request for information associated with a piece of art available in an electronic marketplace;
   obtaining, by the computer system, degradation information and quality information associated with the piece of art that is available in the electronic marketplace, the degradation information and the quality information being specified by a creator of the piece of art, the quality information indicating a quality with which an art sample is to be printed, and the degradation information indicating a time period before degradation of the art sample occurs;
   determining, by the computer system, printing attributes for the art sample based at least in part on the request for the information associated with visual details and textual details for the piece of art, the quality information, and the degradation information, wherein the art sample being is a physically degrading replication of the piece of art, wherein the degrading comprises degradation of ink utilized to print the art sample, degradation of materials utilized to print the art sample, or combinations thereof, with respect to the time period indicated by the degradation information;
   selecting a machine-readable identifier to incorporate into the art sample;
   providing, by the computer system, an instruction to print the art sample according to the printing attributes of the art sample utilizing the ink, the materials, or combinations thereof indicated by the degradation information;
   providing, by the computer system, instructions enabling the art sample to be shipped to the user according to shipping information;
   receiving an indication of an interaction between the user device of the user and the machine-readable identifier;

upon receipt of the indication of the interaction between the user device of the user and the machine-readable identifier, presenting, via an augmented reality application interacting with the user device, an image representative of the piece of art that is superimposed over the art sample in a view of the art sample through the user device; and receiving input, from the user device, comprising a request to reposition the image representative of the piece of art in the view of the art sample through the user device.

5. A system comprising:

a processor; and memory including instructions executable by the processor that, when executed by the processor, cause the system to at least:

receive a request, from a user device of a user, for information associated with a piece of art in an electronic marketplace;

obtain degradation information and quality information associated with the piece of art that is available in the electronic marketplace, the degradation information and the quality information being specified by a creator of the piece of art, the quality information indicating a quality with which an art sample is to be printed, and the degradation information indicating a time period before degradation of the art sample occurs;

determine printing attributes for the art sample based at least in part on the request for the information associated with the piece of art, the quality information, and the degradation information, wherein the art sample is a physically degrading replication of the piece of art, wherein the degrading comprises degradation of ink utilized to print the art sample, degradation of materials utilized to print the art sample, or combinations thereof, with respect to the time period indicated by the degradation information;

select a machine-readable identifier to incorporate into the art sample;

provide an instruction to print the art sample according to the printing attributes of the art sample utilizing the ink, the materials, or combinations thereof indicated by the degradation information;

print the art sample according to the printing attributes of the art sample utilizing the ink, the materials, or combinations thereof indicated by the degradation information;

provide instructions enabling the art sample to be shipped to the user according to shipping information;

receive an indication of an interaction between the user device of the user and the machine-readable identifier;

upon receipt of the indication of the interaction between the user device of the user and the machine-readable identifier, present, via an augmented reality application interacting with the user device, an image representative of the piece of art that is superimposed over the art sample in a view of the art sample through the user device; and receive input, from the user device, comprising a request to reposition the image representative of the piece of art in the view of the art sample through the user device.

\* \* \* \* \*